United States Patent
Hu et al.

(10) Patent No.: US 7,551,298 B2
(45) Date of Patent: Jun. 23, 2009

(54) PRINT CONTROL DEVICE WITH EMBEDDED ENGINE SIMULATION MODULE AND TEST METHOD THEREOF

(75) Inventors: Che-Hung Hu, Taipei (TW); Heng-Chi Hsu, Taipei (TW); Wen-Ning Kuo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 720 days.

(21) Appl. No.: 10/860,273

(22) Filed: Jun. 4, 2004

(65) Prior Publication Data

US 2005/0270561 A1 Dec. 8, 2005

(51) Int. Cl.
*G06F 3/12* (2006.01)
*H04N 17/00* (2006.01)
*H04N 17/02* (2006.01)
*H04N 3/27* (2006.01)

(52) U.S. Cl. .............. 358/1.13; 358/1.15; 348/181; 348/554

(58) Field of Classification Search ............... 358/1.15, 358/2.1, 3.24, 3.27, 483, 1.17, 1.6, 296, 1.13, 358/1.2, 1.12; 714/722; 271/288; 703/19; 348/554, 705, 181; 709/224; 345/502, 107; 399/394, 227; 347/250; 702/106
See application file for complete search history.

(56) References Cited

U.S. PATENT DOCUMENTS

| | | | | |
|---|---|---|---|---|
| 4,691,237 A * | 9/1987 | Shimizu | ............. | 358/409 |
| 4,809,216 A * | 2/1989 | Lai | ............. | 358/1.17 |
| 5,018,079 A * | 5/1991 | Shukunami et al. | ............. | 358/1.6 |
| 5,045,951 A * | 9/1991 | Kimura et al. | ............. | 358/445 |
| 5,095,450 A * | 3/1992 | Shakra et al. | ............. | 358/1.15 |
| 5,164,745 A * | 11/1992 | Matsuoka | ............. | 347/246 |
| 5,542,031 A * | 7/1996 | Douglass et al. | ............. | 358/1.15 |
| 5,566,372 A * | 10/1996 | Ikeda et al. | ............. | 399/46 |
| 5,586,227 A * | 12/1996 | Kawana et al. | ............. | 358/1.13 |
| 5,590,134 A * | 12/1996 | Yin | ............. | 714/722 |
| 5,610,721 A * | 3/1997 | Higuchi et al. | ............. | 358/296 |
| 5,699,494 A * | 12/1997 | Colbert et al. | ............. | 358/1.15 |
| 5,717,697 A * | 2/1998 | Yin | ............. | 714/722 |
| 5,751,470 A * | 5/1998 | Damon | ............. | 358/3.23 |
| 5,859,711 A * | 1/1999 | Barry et al. | ............. | 358/296 |
| 5,963,755 A * | 10/1999 | Ueda et al. | ............. | 399/23 |
| 5,978,943 A * | 11/1999 | Narukawa | ............. | 714/725 |
| 6,034,788 A * | 3/2000 | Sasanuma et al. | ............. | 358/406 |
| 6,075,928 A * | 6/2000 | Kitada et al. | ............. | 358/1.15 |
| 6,134,025 A * | 10/2000 | Takeuchi et al. | ............. | 358/1.2 |
| 6,175,375 B1 * | 1/2001 | Able et al. | ............. | 347/132 |
| 6,236,463 B1 * | 5/2001 | Cyman et al. | ............. | 358/1.14 |
| 6,321,366 B1 * | 11/2001 | Tseng et al. | ............. | 716/6 |
| 6,323,828 B1 * | 11/2001 | Perez | ............. | 345/10 |
| 6,337,958 B1 * | 1/2002 | Stanich et al. | ............. | 399/49 |
| 6,453,460 B1 * | 9/2002 | Keyes | ............. | 717/108 |
| 6,611,880 B1 * | 8/2003 | Simpson et al. | ............. | 710/18 |

(Continued)

*Primary Examiner*—Twyler L Haskins
*Assistant Examiner*—Jonathan R Beckley
(74) *Attorney, Agent, or Firm*—Harness, Dickey & Pierce, P.L.C.

(57) ABSTRACT

A print control device with an embedded engine simulation module and the test method thereof are disclosed. With the engine simulation module is inserted in the print control device, the print engine signal is directly sent to the video signal processor of the print control device. The video signal processor follows the print engine signal along with the clock and video signals to print data signals, thereby testing the print control device. Therefore, adjustments of the print engine signal can directly simulate the situations of supporting different print engines.

7 Claims, 4 Drawing Sheets

U.S. PATENT DOCUMENTS

| | | |
|---|---|---|
| 6,633,403 B1 * | 10/2003 | Nonaka .................... 358/1.15 |
| 6,633,905 B1 * | 10/2003 | Anderson et al. ........... 709/219 |
| 6,646,645 B2 * | 11/2003 | Simmonds et al. ......... 345/502 |
| 6,744,459 B2 * | 6/2004 | Hamada .................... 347/250 |
| 6,927,866 B2 * | 8/2005 | Konishi .................... 358/1.13 |
| 6,934,504 B2 * | 8/2005 | Morita ...................... 399/394 |
| 6,934,834 B2 * | 8/2005 | Melin et al. .................... 713/2 |
| 7,050,182 B2 * | 5/2006 | Meyer ...................... 358/1.13 |
| 7,057,667 B1 * | 6/2006 | Mori et al. ................. 348/554 |
| 7,096,137 B2 * | 8/2006 | Shipton et al. ............. 702/106 |
| 7,119,772 B2 * | 10/2006 | Amundson et al. ........... 345/87 |
| 7,159,193 B2 * | 1/2007 | Wada ....................... 715/838 |
| 7,173,719 B2 * | 2/2007 | Bearss et al. .............. 358/1.13 |
| 7,212,756 B2 * | 5/2007 | Nagata ........................ 399/38 |
| 7,268,900 B1 * | 9/2007 | Zimmerman .............. 358/1.15 |
| 7,278,034 B2 * | 10/2007 | Shipton ..................... 713/300 |
| 7,360,131 B2 * | 4/2008 | Walmsley .................. 714/718 |
| 7,380,208 B2 * | 5/2008 | Ishii et al. .................. 715/274 |
| 7,465,005 B2 * | 12/2008 | Walmsley et al. ............ 347/12 |
| 2002/0186391 A1 * | 12/2002 | Kimizuka et al. .......... 358/1.12 |
| 2003/0095210 A1 * | 5/2003 | Huntley ..................... 348/705 |
| 2004/0018030 A1 * | 1/2004 | Shiraki et al. .............. 399/227 |
| 2004/0207864 A1 * | 10/2004 | Combs et al. ............. 358/1.13 |
| 2005/0001812 A1 * | 1/2005 | Amundson et al. ......... 345/107 |

* cited by examiner

PRINT CONTROL DEVICE WITH EMBEDDED ENGINE SIMULATION MODULE AND TEST METHOD THEREOF

BACKGROUND OF THE INVENTION

1. Field of Invention

The invention relates to a print control device and, in particular, to a print control device embedded in an engine simulation module and the test method thereof.

2. Related Art

The printer is one of the major peripheral devices of the computer. With increasing demands in the market, there is still a huge room for its development. As there are higher demands in the printing quality, the development in printing techniques is also important. This involves improvements in the resolution and printing speed.

A printer can be decomposed into a mechanical part and an electronic control part. The mechanical part refers to the print engine. The resolution of a printer is determined by the dot per inch (dpi) that the print engine can produce in each square inch. The higher the resolution is, the better quality the printer picture will have. The edges also become smoother. The printing speed of a printer usually refers to the top speed of the print engine. The electronic control part is the soul of a printer. It is the print control device built inside the printer, including the processor, memory, fonts, and video interface. The job of a print control device is to convert text and graph data transmitted from a computer host into bitmap data of 0 and 1, where 1 means a black dot while 0 means blank. Using the bitmap print data, the video interface controls the print engine to print ink at correct positions. Therefore, the print control device has to perform complicated text, image or graph processing. Thus, in addition to the resolution of the print engine, the actual resolution also relies on the adjustment of the print control device. Moreover, the top speed can be reached only when processing text data. It is very hard to print at the top speed for image or complicated print jobs. It is restricted by the print data transmission rate and the data processing rate of the print control device. Furthermore, to increase the printing quality, new techniques in enhancing the resolution and memory appear all the times. The logic circuit, peripheral, and memory interfaces integrated in the print control device are implemented using an application specific integrated circuit (ASIC). It can achieve the required printing quality through simple and minimal communications with the central processing unit (CPU) of the host computer.

Based upon the above-mentioned idea, to perform a printing system is a tremendous task. To shorten the test cycle for the ASIC in the print control device is particularly important. Since the print control device has to support various kinds of print engines, it is necessary to build an engine interface and a connector that are compatible with the print control device when designing a new print engine. This increases the test time and design costs. In order to shorten the test time, one can use a pattern generator to generate the required print engine signals. Using the pattern generator, different print engine signal can be generated in a programmable way. However, it is not easy to carry normal pattern generator. Another solution is a print engine simulator that uses a specially design circuit to provide the print engine signal. However, one still has to provide a new connector for a newly designed print engine in order to perform tests.

SUMMARY OF THE INVENTION

To solve the problems in the prior art, the invention provides a print control device is embedded with an engine simulation module and the test method thereof. Using the engine simulation module inserted in the print control device, the invention can directly provide print engine signals for tests. Therefore, one can simulate supporting different print engines through adjustments in the print engine signals.

The disclosed print control device with an embedded engine simulation module is used to test a print control device. Its character is in that the engine simulation module is embedded in the print control device and connected to the video signal processor thereof. The engine simulation module receives a clock signal and output a print engine signal. The video signal processor receives the clock signal, the print engine signal and a video signal, and output a print data signal. The video signal processor can selectively receive one of the print engine signals output by the engine simulation module and an external engine.

In accord with the above-mentioned print control device, the invention provides a test method for the print control device with an embedded engine simulation module. The steps include: provide a the print control device with an embedded engine simulation module connected to the video signal processor of the print control device. A clock-generator module transmits a clock signal to the engine simulation module and the video signal processor; the engine simulation module's outputting a print engine signal to the video signal processor. The host (PC) transmits a video signal to the video signal processor and the video signal processor outputs a print data signal according to the print engine signal.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
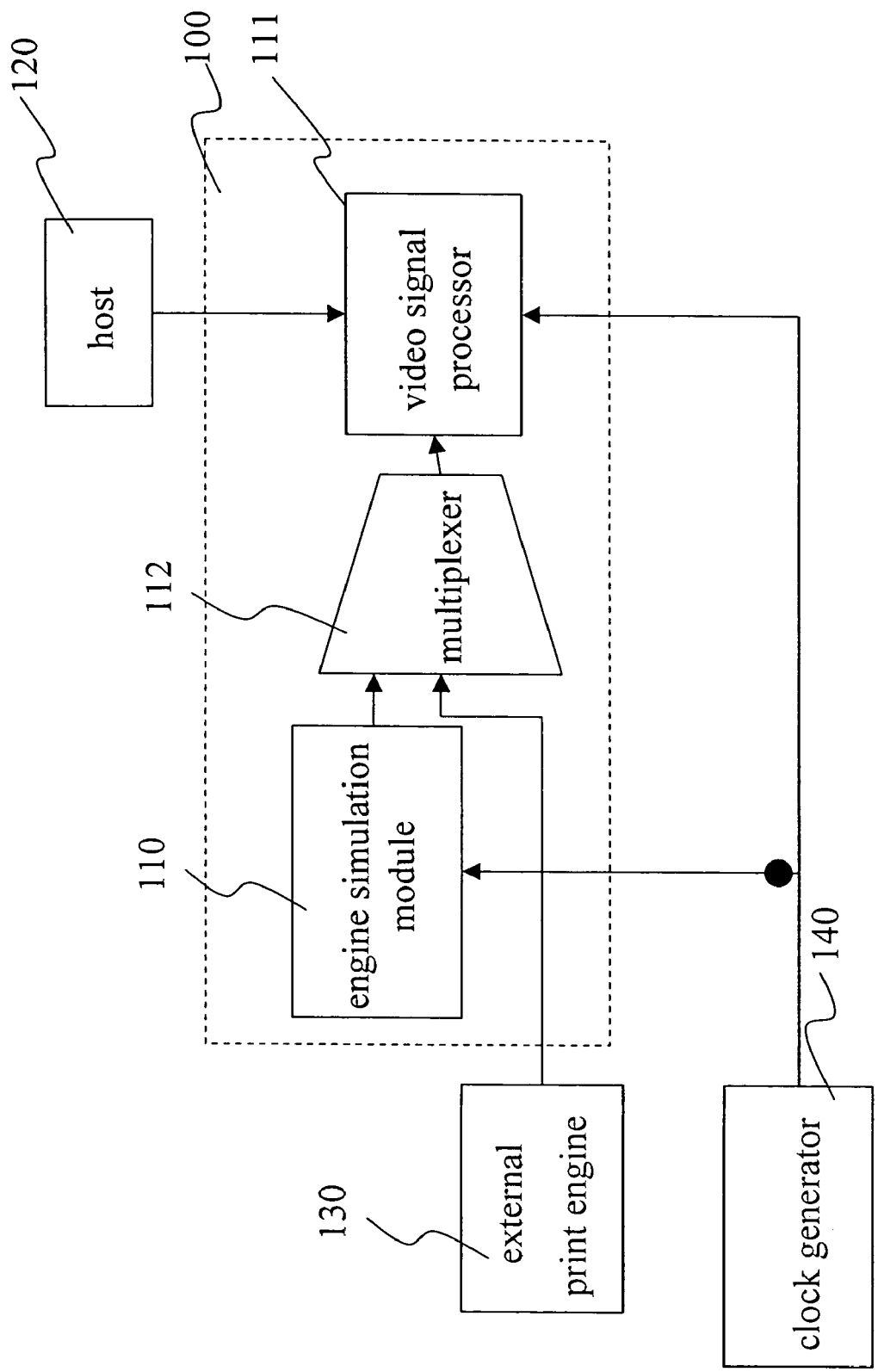
FIG. 1 is a schematic view the disclosed circuit.

With reference to FIG. 1, the disclosed print control device 100 contains an engine simulation module 110 and a video signal processor 111. The engine simulation module 110 is connected to the video signal processor 111. The print control device 100 is connected to a host 120, an external print engine 130 and a clock generator 140 to receive their signals. The host 120 provides a video signal to be printed. The engine simulation module 110 generates various simulated print engine signals. It can adopt an application specific integrated circuit (ASIC) or a field programmable gate array (FPGA) circuit with the reconfigurable property . The engine simulation module 110 can output the required print engine signal according to the clock signal CLK received from the clock generator 140 and the user's settings.

Figure 2:
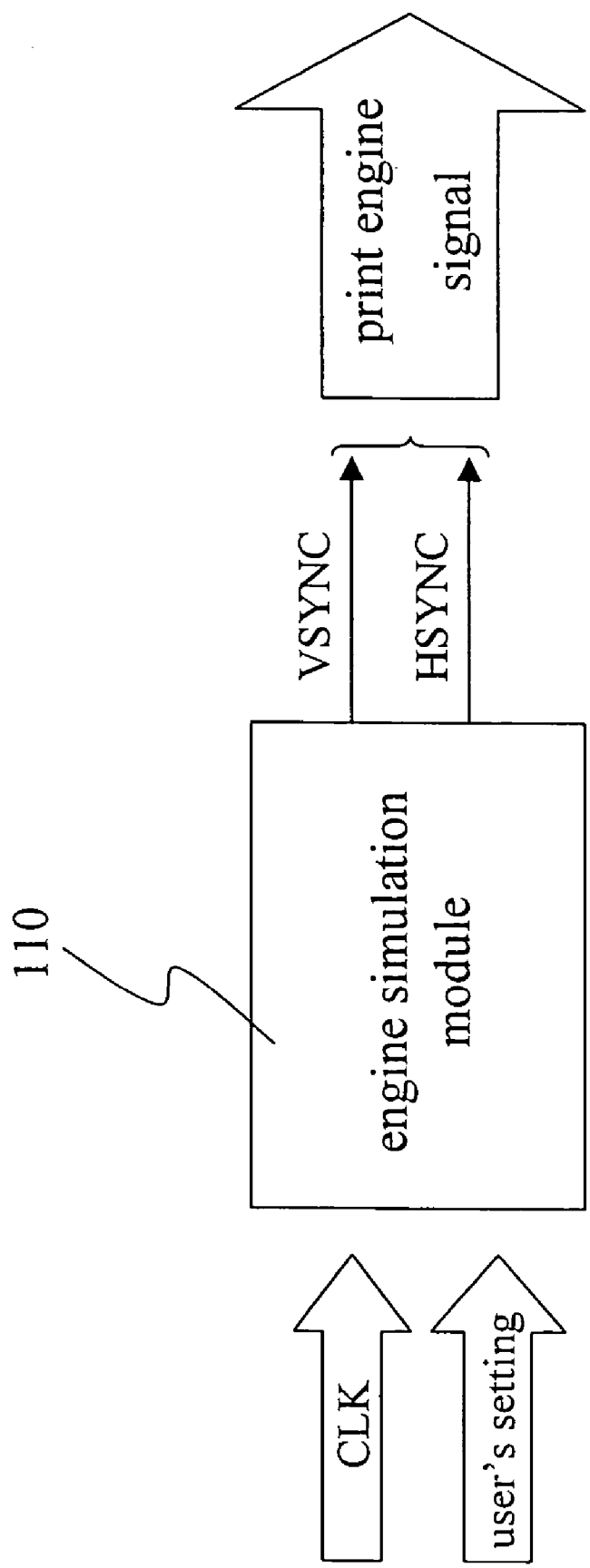
FIG. 2 is a schematic view of the output and input signals of the engine simulation module.
Figure 3:
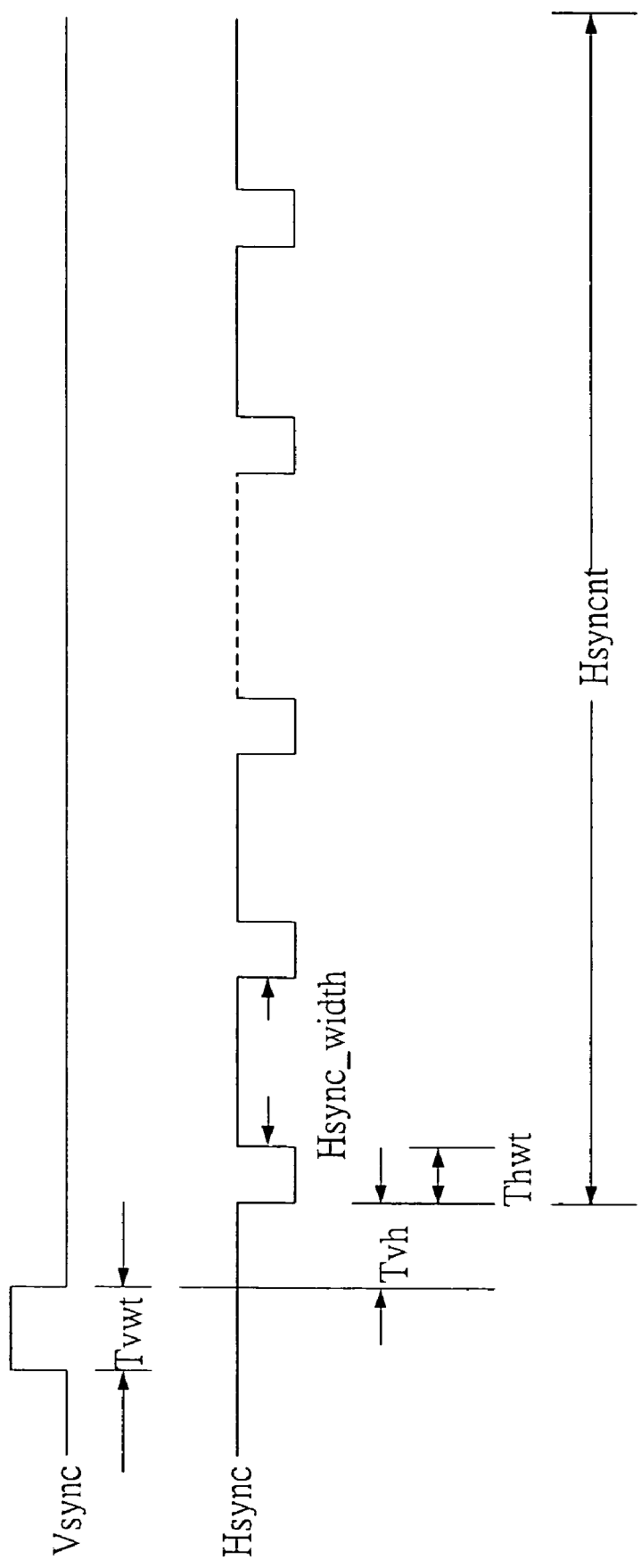
FIG. 3 is a schematic view of adjustable values of the vertical synchronization signal and the horizontal synchronization signal.

A general print engine signal contains a vertical synchronization signal VSYNC as the paper sending signal and a horizontal synchronization signal HSYNC as the row start print signal. As shown in FIG. 2, CLK is the clock signal transmitted to the engine simulation module. VSYNC and HSYNC are the vertical synchronization signal and the horizontal synchronization signal. The disclosed engine simulation module can use the entered clock signal and the user's settings to adjust the vertical synchronization signal and the horizontal synchronization signal as the required print engine signal. With reference to FIG. 3, the adjustable values include the Vsync wait time, tvwt, the delay time for Hsync after Vsync, tvh, Hsync wait time, thwt, and the number of Hsync, Hsyncnt.

As shown in FIG. 1, the simulated print engine signal generated by the engine simulation module 110 is transmitted to the video signal processor 111, which receives the clock signal, the print engine signal, and the video signal and outputs a print data signal. The video signal processor 111 can be connected to the engine simulation module 110 and the external print engine 130 via a multiplexer 112. The video signal processor 111 selectively receives one of the print engine signals output by the engine simulation module 110 and the external print engine 130 according to the user's control.

Figure 4:
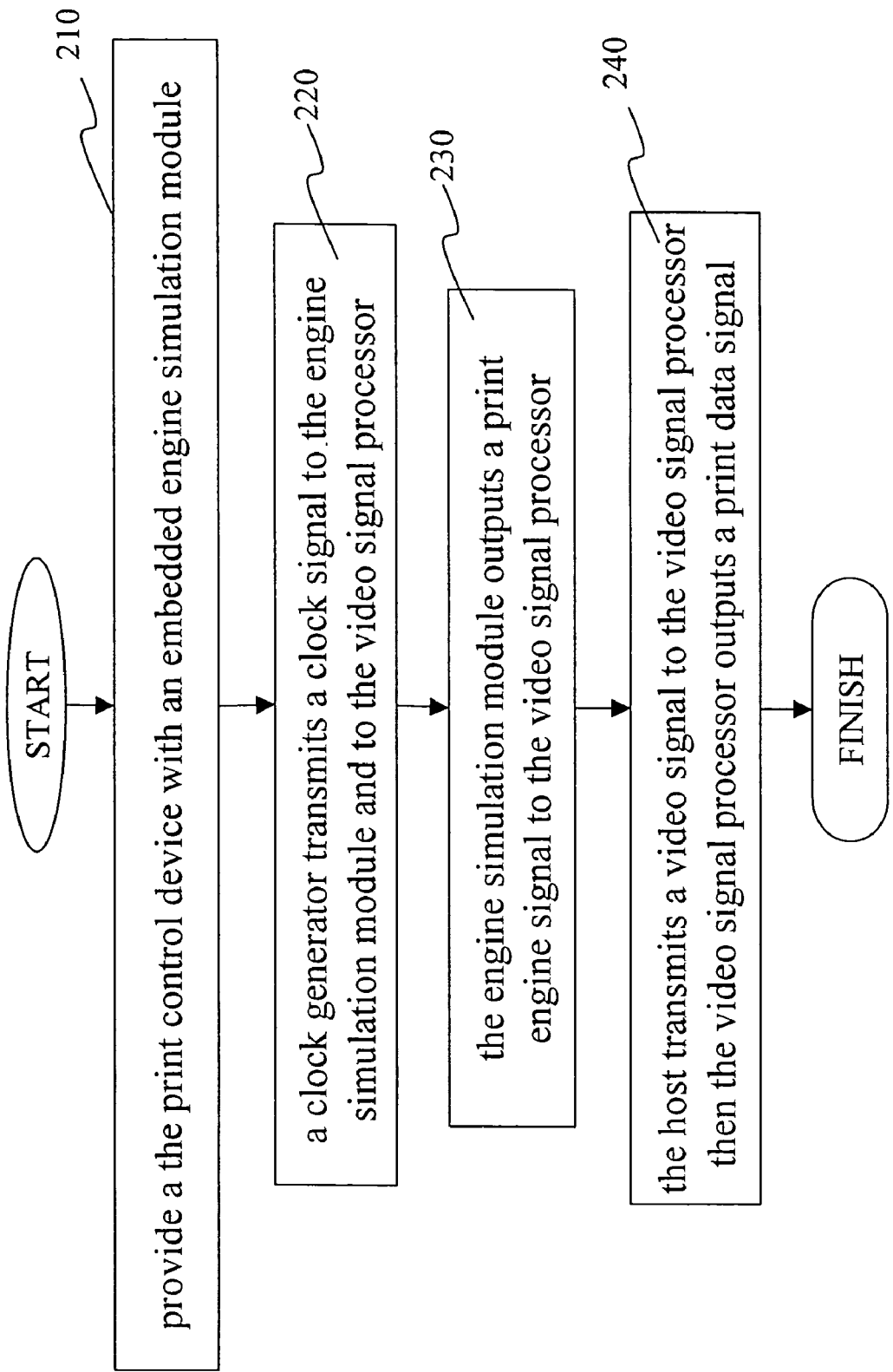
FIG. 4 is a flowchart of the disclosed test method.

With the above-mentioned print control device, the invention can further perform tests on the print control device with an embedded engine simulation module. With reference to FIG. 4, the disclosed test method has the steps of: provide a the print control device with an embedded engine simulation module (step 210) connected to the video signal processor of the print control device. A clock generator transmits a clock signal to the engine simulation module and to the video signal processor (step 220); the engine simulation module outputs a print engine signal to the video signal processor (step 230); and the host transmits a video signal to the video signal processor then the video signal processor outputs a print data signal (step 240). The method provides a rapid way to compare the video signal and the print data signal; moreover, it's a tool to analyze the printing capacity of the print control device before connecting to a real engine.

Certain variations would be apparent to those skilled in the art, which variations are considered within the spirit and scope of the claimed invention.

What is claimed is:

1. A print control device, which is adapted to be used within a printer and is connected to a host which generates a video signal, an external print engine and a clock generator, characterized in that the print control device comprises a video signal processor and an embedded engine simulation module connected to the video signal processor for testing the print control device, the engine simulation module receives a clock signal generated by the clock generator and outputs a simulated print engine signal generated by the engine simulation module and the external print engine generates a print engine signal and outputs a print data signal, wherein the video signal processor selectively receives one of:

during a normal operation, the signals from the external print engine, and during a testing operation, the signals from the engine simulation module to test the print control device.

2. The print control device of claim 1, wherein the engine simulation module is an application specific integrated circuit (ASIC).

3. The print control device of claim 1, wherein the engine simulation module is a field programmable gate array (FPGA) circuit.

4. The print control device of claim 1, wherein the engine simulation module outputs the simulated print engine signal according to the clock signal and users's settings.

5. The print control device of claim 1, wherein the print engine signal contains a vertical synchronization signal, VSYNC, as the paper sending signal and a horizontal synchronization signal, HSYNC, as the row start print signal.

6. The print control device of claim 5, wherein the vertical synchronization signal is controlled by a plurality of adjustable values selected from the group consisting of a Vsync wait time, a delay time for Hsync after Vsync, a Hsync wait time, and a number of Hsync.

7. The print control device of claim 1, wherein the video signal processor is connected to the engine simulation module and the external print engine via a multiplexer in order for the video signal processor to selectively receive the simulated signal generated by the engine simulation module or the print engine signal generated by the external engine.

* * * * *